United States Patent [19]

Matsuura et al.

[11] Patent Number: 5,853,466
[45] Date of Patent: Dec. 29, 1998

[54] MEDIUM FOR EMULSION INK FOR STENCIL PRINTING

[75] Inventors: Tomoko Matsuura; Teruaki Okawa, both of Inashiki-gun, Japan

[73] Assignee: Riso Kagaku Corporation, Tokyo, Japan

[21] Appl. No.: 884,633

[22] Filed: Jun. 27, 1997

[30] Foreign Application Priority Data

Jun. 27, 1996 [JP] Japan .................................. 8-188464

[51] Int. Cl.⁶ ................................................... C09D 11/02
[52] U.S. Cl. ...................... 106/31.26; 106/31.6; 106/31.9
[58] Field of Search ................................. 106/31.26, 31.6, 106/31.9

[56] References Cited

U.S. PATENT DOCUMENTS

| | | | |
|---|---|---|---|
| 4,585,815 | 4/1986 | Ono et al. | 524/23 |
| 5,378,739 | 1/1995 | Koike et al. | 523/161 |
| 5,637,137 | 6/1997 | Okuda et al. | 106/31.26 |
| 5,667,570 | 9/1997 | Okuda et al. | 106/31.26 |

FOREIGN PATENT DOCUMENTS 6-212108  8/1994  Japan .

OTHER PUBLICATIONS

Derwent Publications Ltd., Abstract, JP 05 070 730, Mar. 23, 1993, Section Ch, Week 9317, London, GB.

*Primary Examiner*—Helene Klemanski
*Attorney, Agent, or Firm*—Pillsbury, Madison & Sutro LLP; Cushman Darby & Cushman IP Group

[57] ABSTRACT

A medium for water-in-oil (W/O) emulsion ink for stencil printing is provided, which is useful for diluting the emulsion ink to obtain a transparent and pale color ink without lowering viscosity of the ink. The medium is a water-in-oil (W/O) emulsion comprising an oil phase and a water phase, in which the medium contains an extending pigment in the oil phase but is free from coloring pigments. The medium preferably has an optical density value of 1.4 or more as measured by a reflection densitometer when the medium is applied and dried in a thickness of 50 $\mu$m onto a transparent sheet placed on a black standard board, and has 32 or less of flow value in one minute as measured by a spreadometer. The extending pigment preferably constitutes 1 to 5% by weight of the total weight of the medium, and may be inorganic fine particles or organic fine particles that are insoluble in said oil phase. The inorganic fine particles may be those subjected to lipophilic treatment.

7 Claims, No Drawings

MEDIUM FOR EMULSION INK FOR STENCIL PRINTING

FIELD OF THE INVENTION

The present invention relates to a medium for emulsion ink for stencil printing, and more specifically relates to a medium which is useful for diluting water-in-oil (W/O) emulsion ink for stencil printing to obtain transparent emulsion ink for stencil printing.

BACKGROUND INFORMATION

Stencil printing is effected by perforating a stencil sheet to make a master, and passing ink through the perforated portions of the master to an article to be printed such as printing paper. Since the master is easy to make, stencil printing is utilized in a wide range of fields.

As stencil printing ink, is usually used water-in-oil (W/O) emulsion ink which contains pigments as colorants in the oil phase thereof. Since different colors of ink are supplied depending upon kinds of colorants, multicolor printing is also possible using these colors of ink.

Multicolor stencil printing is often effected by previously printing a pattern in outline on printing paper, and then overlaying the printing paper with stencil printing to color the regions within the outline of the pattern. However, since conventional ink for stencil printing lacks transparency, the previously printed pattern is hidden so that desired effect of multicolor printing cannot be attained, if the overlay printing discords with the previously printed pattern.

In order to dilute color of stencil printing ink, white ink is often mixed with color ink. In this case, however, it is difficult to impart transparency to the color ink. If stencil printing ink is diluted by adding thereto mineral oils such as kerosene and spindle oil or vegetable oils such as linseed oil, soybean oil and tung oil, the ink is provided with transparency, but is softened which causes blurring of printing.

SUMMARY AND OBJECTS OF THE INVENTION

The object of the present invention is to provide a medium for emulsion ink for stencil printing, which is useful for diluting conventional ink for stencil printing to impart transparency thereto without affecting viscosity of the ink or causing the ink to blot or spread.

According to the present invention, the above object has been attained by a medium for water-in-oil (W/O) emulsion ink for stencil printing, which is a water-in-oil (W/O) emulsion comprising an oil phase and a water phase, in which the medium contains an extending pigment in the oil phase but is free from coloring pigments.

According to the present invention, the medium not only forms a water-in-oil (W/O) emulsion as so does emulsion ink to be diluted, but also contains an extending pigment in the oil phase so as to be viscose and transparent. Thus, the present medium can be used to make color of ink diluted and transparent without changing property or workability of the ink to be diluted.

DETAILED DESCRIPTION OF THE INVENTION

A medium for water-in-oil (W/O) emulsion ink for stencil printing is provided, which is useful for diluting the emulsion ink to obtain a transparent and pale color ink without lowering viscosity of the ink. The medium is a water-in-oil (W/O) emulsion comprising an oil phase and a water phase, in which the medium contains an extending pigment in the oil phase but is free from coloring pigments. The medium preferably has an optical density value of 1.4 or more as measured by a reflection densitometer when said medium is applied and dried in a thickness of 50 μm onto a transparent sheet placed on a black standard board, and has 32 or less of flow value in one minute as measured by a spreadometer. The extending pigment preferably constitutes 1 to 5% by weight of the total weight of the medium, and may be inorganic fine particles or organic fine particles that are insoluble in said oil phase. The inorganic fine particles may be those subjected to lipophilic treatment.

The extending pigment herein means fine particles which are substantially insoluble in the oil phase with a refractive index close to the oil phase so that they can be transparent or translucent dispersoids in the oil phase. The present medium preferably has an optical density (hereinafter referred to as "OD") value of 1.4 or more as measured by a reflection densitometer when the medium is applied and dried in a thickness of 50 μm onto a transparent sheet placed on a black standard board. When the OD value is lower than 1.4, the medium comes to be so high in hiding power that ink diluted by the medium becomes cloudy but can not be transparent.

Addition amount of the extending pigment can be varied depending upon viscosity of ink to be diluted. When the present medium is designed to dilute stencil printing ink for use in portable stencil printing machines, the medium is prepared to have a consistency represented by 32 or less of a flow value in one minute measured by a spreadometer, and typically contains the extending pigment in an amount of 1 to 5% by weight based on the total weight of the medium. When the addition amount of the extending pigment is less than 1% by weight, the ink diluted by the medium tends to blot on printing paper. When it is more than 5% by weight, the ink becomes too viscous to pass perforated portions of stencil sheets upon printing.

As the extending pigment, can be used organic or inorganic fine particles which can pass light or are transparent in the oil phase. Examples of the inorganic fine particles are calcium carbonate, precipitated barium sulfate, barite powder, silica, alumina white, aluminum hydroxide, kaolin, clay, talc, bentonite, and the like. These inorganic fine particles are preferably those which have been subjected to lipophilic treatment in order to ensure pot life of emulsion. Such lipophilic treatment includes a treatment with a resin acid or fatty acid and a treatment with silicone resin. The organic fine particles should be insoluble or should not be dissolved in the oil phase substantially. Examples of the organic fine particles are fine particles of polyacrylic acid esters, polyurethane, polyethylene, polypropylene, polyvinyl chloride, waxes and the like.

The oil phase of the present W/O emulsion medium is composed essentially of the above extending pigment, a solvent consisting of a non-volatile solvent and/or a volatile solvent, and an emulsifier. The oil phase may optionally comprise a resin in order to adjust viscosity of the medium or improve printability such as fixation of ink.

As the non-volatile solvent, can be used mineral oils such as motor oils, spindle oils, machine oils and liquid paraffin, and vegetable oils such as olive oil, castor oil, salad oils and soybean oil. As the volatile solvent, can be used known solvents of the types of mineral oils and vegetable oils.

The emulsifier is used to form the W/O emulsion of the medium, and is preferably a nonionic surfactant. As such a nonionic surfactant, mention may be made of sorbitan higher-fatty acid esters such as sorbitan monolaurate, sorbitan monopalmitate, sorbitan monostearate, sorbitan tristearate, sorbitan monooleate and sorbitan sesquioleate as well as fatty acid monoglycerides, fatty acid diglycerides, and ethylene oxide adducts of higher alcohols, alkylphenols, fatty acids or the like.

As the resin, mention may be made of rosin ester, rosin-modified maleic resin, rosin-modified phenolic resin, alkyd resin, petroleum resin, xylene resin, polyamide resin, and the like.

The water phase of the present W/O emulsion medium can be water to which water soluble additives such as wetting agents, electrolytes, antifungal agents, antioxidants, water evaporation inhibiting agents and the like are optionally added.

The present water-in-oil (W/O) emulsion medium can be made, for example, by gradually adding 90 to 30% by weight of the above mentioned water phase to 10 to 70% by weight of the above mentioned oil phase to emulsify the mixture by use of a stirrer or the like.

EXAMPLES

Hereinafter, the present invention will be explained in more detail by way of presently preferred working examples. However, it should be understood that the present invention is not limited to the examples. In the following examples, the term "part(s)" means "part(s) by weight" unless otherwise indicated.

Examples 1–6, Comparative Example 1

A water-in-oil (W/O) emulsion medium was prepared in accordance with the formulation shown in Table 1 in a manner mentioned below. First, a varnish was prepared by adding a resin to a solvent and dissolving it therein by heat. After an extending pigment and an emulsifier were added to and mixed with the varnish, the mixture was kneaded by use of a mill having three rollers. The solvent was further added to the kneaded product under stirring to obtain an oil phase.

Then, a water phase was obtained by adding glycerin to an ion-exchanged water. A water-in-oil (W/O) emulsion medium was prepared by gradually adding the water phase to the oil phase under stirring by a stirrer to cause emulsification. A flow value in one minute was measured by a spreadometer in terms of the resultant emulsion medium in a manner described in Japanese Patent Publication (Kokoku) No. 23601/79 the procedure of which is equivalent to JIS (Japanese Industrial Standards) K 5701.

Performance Tests

Each emulsion medium obtained in Examples 1 to 6 and Comparative Example 1 was evaluated in terms of workability upon mixing with ink, transparency and blurring with ink mixed with the medium, and OD value ( i.e., reflection density) of the medium on the black standard board, in the manners as mentioned below. The results are shown in Table 2.

(1) Workability upon mixing with ink: Twenty (20) parts by weight of a medium was mixed with 1 part of "PRINT GOCCO HM INK RED" (trade name) manufactured by RISO KAGAKU CORPORATION by use of a spatula. When it was felt easy to mix them, the result was shown as (+). When it was felt difficult to mix them, the result was shown as (−).

(2) Transparency of ink (observed with the naked eye): A pattern was previously printed with a brown ink on pieces of printing paper. Then, another printing was effected on the pattern with a portable stencil printing machine "PRINT GOCCO" (trademark) PG-11 manufactured by RISO KAGAKU CORPORATION using each of the ink that was mixed and diluted with a medium in the above (1). When it was observed with the naked eye that a watercolor-like pale color was provided with the paper without the previously printed pattern being hidden, the result was shown as (++). When it was observed with the naked eye that the previously printed pattern was hidden and existence of the pattern was not noticed, the result was shown as (−). When the observation with the naked eye was between (++) and (−), the result was shown as (+). When it was observed with the naked eye that color of ink used for the latter printing was too pale to notice existence of the latter printing, the result was shown as (=).

(3) Blurring with ink: Stencil printing was effected on pieces of printing paper with a portable stencil printing machine "PRINT GOCCO" (trademark) PG-11 manufactured by RISO KAGAKU CORPORATION using the ink that was mixed and diluted with a medium in the above (1). Then, state of blurring was observed with a loupe of 10 magnifications at portions of the obtained prints on which printing ink was deposited. When little blurring was observed, the result was shown as (+). When blurring was remarkable, the result was shown as (−).

(4) Reflection density (OD value) on black standard board: A coat of a medium was formed by applying a medium in a thickness of 50 μm onto a transparent polyester film of 50 μm in thickness with a YBA-type baker applicator, and then dried under environmental conditions. Then, the polyester film was placed on a black standard board, and a reflection density on the coat was measured by use of a reflection densitometer Macbeth RD920 manufactured by Kollmorgen Corp. Meanwhile, the black standard board was a standard board for density calibration for use with the above reflection densitometer, and had a black density of 1.80.

TABLE 1

Formulations of W/O emulsion (parts by weight)

| Number of Examples | Ex. 1 | Ex. 2 | Ex. 3 | Ex. 4 | Ex. 5 | Ex. 6 | C. Ex. 1 |
|---|---|---|---|---|---|---|---|
| Oil phase: | | | | | | | |
| Extending pigments: | | | | | | | |
| Silica | 1.0 | — | — | 2.0 | 0.5 | 6.0 | — |
| Calcium carbonate | — | 2.0 | — | — | — | — | — |
| Polyethylene powder | — | — | 5.0 | — | — | — | — |
| White pigment: | | | | | | | |
| Titanium white | — | — | — | — | — | — | 3.0 |
| Resin: | | | | | | | |
| Alkyd resin | 2.0 | 2.0 | 2.0 | 2.0 | 2.0 | 2.0 | 2.0 |
| Rosin-modified phenolic resin | 4.0 | 7.0 | 7.0 | — | 7.0 | 7.0 | 7.0 |
| Petroleum resin | 4.0 | — | — | 8.0 | — | — | — |
| Emulsifier: | | | | | | | |
| Sorbitan monooleate | 3.0 | 3.0 | 3.0 | 3.0 | 3.0 | 3.0 | 3.0 |
| Solvent: | | | | | | | |
| No. 6 Solvent (manufactured by Nippon Oil Co. Ltd.) | 14.0 | 14.0 | 12.0 | 12.0 | 15.0 | 11.0 | 14.0 |

TABLE 1-continued

Formulations of W/O emulsion (parts by weight)

| Number of Examples | Ex. 1 | Ex. 2 | Ex. 3 | Ex. 4 | Ex. 5 | Ex. 6 | C. Ex. 1 |
|---|---|---|---|---|---|---|---|
| #40 Motor oil | 2.0 | 2.0 | 1.0 | 3.0 | 2.5 | 1.0 | 2.0 |
| Water phase: | | | | | | | |
| Water: | | | | | | | |
| Ion-exchanged water | 65.0 | 65.0 | 65.0 | 65.0 | 65.0 | 65.0 | 65.0 |
| Water evaporation inhibiting agent: | | | | | | | |
| Glycerin | 5.0 | 5.0 | 5.0 | 5.0 | 5.0 | 5.0 | 5.0 |

Note: "Ex." refers to Example, and "C. Ex." refers to Comparative Example.

TABLE 2

Results of performance tests

| Number of Examples | Ex. 1 | Ex. 2 | Ex. 3 | Ex. 4 | Ex. 5 | Ex. 6 | C. Ex. 1 |
|---|---|---|---|---|---|---|---|
| Transparency of ink (observed with naked eye): | (++) | (++) | (++) | (++) | (++) | (++) | (−) |
| Workability upon mixing with ink | (+) | (+) | (+) | (+) | (+) | (−) | (+) |
| Blurring with ink: | (+) | (+) | (+) | (+) | (−) | (+) | (+) |
| OD value on black standard board: | 1.50 | 1.43 | 1.47 | 1.53 | 1.58 | 1.45 | 0.71 |
| Flow value in one minute measured by spreadometer: | 28 | 24 | 27 | 27 | 33 | 22 | 30 |

Note: "Ex." refers to Example, and "C. Ex." refers to Comparative Example.

Mediums of Examples 1 to 6, which contained extending pigments, had an OD value of over 1.4 on the black standard board, and provided diluted ink excellent in transparency. In particular, mediums of Examples 1 to 4, which contained extending pigments in amounts of 1 to 5% by weight based on the total weight of the medium, was excellent in workability and did not cause blurring of printing. On the other hand, the medium of Comparative Example 1, which contained a white color pigment, lacked transparency and was not able to serve as a proper medium.

Since the present medium is in a form of W/O emulsion and also contains an extending pigment in the oil phase thereof, it is viscose and transparent. Thus, when the present medium is used for diluting emulsion ink for stencil printing, it does not lower the viscosity of ink, and the diluted ink has a transparent and pale color. Further, the diluted ink does not cause blurring of printing on printing paper, and does not hide a previously printed pattern even when the pattern is overlaid or printed therewith. Thus, the present medium makes it easier to effect multicolor printing with conventional stencil printing machines. Moreover, by virtue of the transparency of the ink diluted with the present medium, a watercolor-like taste can be provided with prints.

What we claim is:

1. A medium for water-in-oil (W/O) emulsion ink for stencil printing, which is a water-in-oil (W/O) emulsion comprising an oil phase and a water phase, wherein said medium contains an extending pigment in said oil phase but is free from coloring pigments in said oil phase and in said water phase.

2. A medium according to claim 1, which has an optical density value of 1.4 or more as measured by a reflection densitometer when said medium is applied and dried in a thickness of 50 $\mu$m onto a transparent sheet placed on a black standard board.

3. A medium according to claim 1, which has 32 or less of flow value in one minute as measured by a spreadometer.

4. A medium according to claim 1, in which said extending pigment constitutes 1 to 5% by weight of the total weigh of the medium.

5. A medium according to claim 1, in which said extending pigment is inorganic fine particles.

6. A medium according to claim 1, in which said extending pigment is organic fine particles that are insoluble in said oil phase.

7. A medium according to claim 5, in which said inorganic fine particles are those subjected to lipophilic treatment.

* * * * *